(12) United States Patent
Foster et al.

(10) Patent No.: US 8,050,629 B2
(45) Date of Patent: Nov. 1, 2011

(54) OPTIMIZING POWER SETTINGS IN A COMMUNICATION SYSTEM TO MITIGATE INTERFERENCE

(75) Inventors: Gerard T. Foster, Swindon (GB); David Lahiri L. Bhatoolaul, Swindon (GB); Lorenz F. Freiberg, Swindon (GB); Richard Heywood, Cirencester (GB)

(73) Assignee: Motorola Mobility, Inc., Libertyville, IL (US)

( * ) Notice: Subject to any disclaimer, the term of this patent is extended or adjusted under 35 U.S.C. 154(b) by 995 days.

(21) Appl. No.: 11/876,105

(22) Filed: Oct. 22, 2007

(65) Prior Publication Data
US 2009/0104912 A1 Apr. 23, 2009

(51) Int. Cl.
*H04B 15/00* (2006.01)
*H04B 7/00* (2006.01)
*H04W 36/00* (2009.01)
*H04W 40/00* (2009.01)

(52) U.S. Cl. ....... 455/63.1; 455/444; 455/446; 455/453; 455/522; 370/331

(58) Field of Classification Search .................. 455/444, 455/446, 448, 453, 522, 67.11, 67.13, 63.1, 455/443, 447, 449
See application file for complete search history.

(56) References Cited

U.S. PATENT DOCUMENTS

| | | | | |
|---|---|---|---|---|
| 6,067,446 A | * | 5/2000 | Persson et al. ................... | 455/69 |
| 6,131,031 A | * | 10/2000 | Lober et al. ................... | 455/444 |
| 6,438,379 B1 | * | 8/2002 | Gitlin et al. ................... | 455/449 |
| 6,546,252 B1 | * | 4/2003 | Jetzek et al. ................... | 455/437 |
| 6,735,438 B1 | * | 5/2004 | Sabatino ........................ | 455/427 |
| 2004/0203419 A1 | * | 10/2004 | Crocker et al. ............. | 455/67.11 |
| 2008/0002626 A1 | * | 1/2008 | Yokoyama ..................... | 370/331 |
| 2008/0062925 A1 | * | 3/2008 | Mate et al. ..................... | 370/331 |
| 2008/0186941 A1 | * | 8/2008 | Baker et al. .................... | 370/345 |
| 2008/0259883 A1 | * | 10/2008 | Mishra et al. ................. | 370/338 |

FOREIGN PATENT DOCUMENTS

WO 2006079689 A1 8/2006

OTHER PUBLICATIONS

Shupeng, Li et al.: "Network Coordination and Interference Mitigation for HSDPA and EV-DO Forward Link", GLOBECOM, 2006, IEEE, Global Telecommunications Conference 2006, Nov. 27, 2006-Dec 1, 2006, pp. 1-5.
3GPP TR 125.991 V5.1.0, 3rd Generation Partnership Project, Technical Specification Group Radio Access Network, Universal Mobile Telecommunications System (UMTS); Feasibility study on the mitigation of the effect of Common Pilot Channel (CPICH) interference at the user equipment (3GPP TR 25.991 version 5.1.0 Release 5), Dec. 2002, all pages.

* cited by examiner

*Primary Examiner* — Marivelisse Santiago Cordero
*Assistant Examiner* — Mong-Thuy Tran

(57) ABSTRACT

A method includes a first step of monitoring a noise floor. A next step includes determining if the noise floor crosses a threshold level. A next step includes preventing any further increases in a Common Pilot Channel power level. A next step includes randomly selecting and performing an interference mitigation measure. A next step includes monitoring an interference level. A next step allows further increases in a Common Pilot Channel power level if the interference abates by more than a predetermined amount.

6 Claims, 2 Drawing Sheets

OPTIMIZING POWER SETTINGS IN A COMMUNICATION SYSTEM TO MITIGATE INTERFERENCE

FIELD OF THE INVENTION

The invention relates to interference in a wireless cellular communication system and in particular, but not exclusively, to power settings of cells in a multi-layer cellular communication system.

BACKGROUND OF THE INVENTION

A method which has been used to increase the capacity of cellular communication systems is the concept of hierarchical cells wherein a macro-cell layer is underlayed by a layer of typically smaller cells having coverage areas within the coverage area of the macro-cell. In this way, smaller cells, known as micro-cells, pico-cells, or femto-cells, are located within the same coverage area as larger macro cells. The pico-cells and femto-cells have much smaller coverage thereby allowing a much closer reuse of resources. Frequently, the macro-cells are used to provide coverage over a large area, and the smaller underlay cells are used to provide additional capacity in densely populated areas and hotspots, for example. Furthermore, femto-cells can also be used to provide coverage in specific locations such as within a residential home or office. In order to efficiently exploit the additional resource, it is important that any interference between the macro-cell layer and the underlying layer is minimized.

Currently $3^{rd}$ generation (3G) cellular communication systems based on Code Division Multiple Access (CDMA) technology, such as the Universal Mobile Telecommunication System (UMTS), are being deployed, with a trend towards introducing a large number of femto-cells in these 3G systems. For example, it is envisaged that a Residential Access Point (RAP) may be deployed having a target coverage area of only a single residential dwelling or house. A widespread introduction of such a system would result in a very large number of small underlay cells within a single macro-cell.

Generally, during deployment of a cellular network of macro cells and underlay cells, the planned layout is fixed and known. In a centrally controlled database deployment process, well established techniques exist to calculate the optimal pilot power levels. For example, the underlay access points of such systems receive a neighbour list identifying a number of neighbour cells and the access points measure pilot signal power levels of these neighbour cells. These levels for each neighbour macro-cell is measured and reported back to the central database, such as in a radio network controller (RNC) or Mobile Switching Centre (MSC). The central database then uses these measurements to determine an appropriate pilot power level for that femto-cell. However, a problem arises in the introduction of underlaying cells, such as residential deployments of femto-cells where the deployment process is incremental, unilateral, and ad hoc.

In particular, a UMTS RAP may need to be able to operate on the same frequency as a macro layer cell in the UMTS network. Under these circumstances and without coordination between the RNC of the macro layer and the RAP layer, and considering a much smaller dynamic range of power control at the RAP, there are cases where the RAP suffers interference from macro layer user equipment (UE) in close proximity thereto and vice versa. In the case of inbound interference case to the RAP from the Macro system the RAP suffers problematic noise rises and the only way out of these difficulties is to turn up its power which can, according to specific scenario, cause two subsequent effects; a) a coverage hole in the macro environment due to RAP power spillover that macro UEs may not be able to camp on themselves, and b) cause so much noise rise (if many RAPs are in the vicinity and there are many connected RAP-UEs) at the Macro node-B site that the macro environment becomes unstable itself (i.e. there is a net reduction in macro capacity).

Obviously the RAP needs to be sensitive to macro layer UEs or the RAP will cause a net reduction in coverage in the macro environment. Similar effects, but less dramatic overall, occur with mutual RAP-to-RAP interference cases, However, generally RAPs seek to constantly keeping their powers low to avoid such situations while maintaining adequate power for their UE clients. Additionally, an ad hoc cellular system that consists of femto-cells of residential access points and macro layer mobile user equipment is by definition changeable. No settings, regardless of how optimal, are stable for long, and will change over time.

There are many traditional inter-frequency and power control algorithms defined in the art, however these solution require some amount of coordination or control between the hierarchical layers of the communication system. Even within the one layer of the RAP environment there is no coordination between RAPs.

What is needed is power control optimization on the part of the RAPs that can be performed unilaterally without coordination between the macro layer RNCs, NodeBs, or other RAPs.

SUMMARY OF THE INVENTION

Accordingly, the Invention seeks to preferably mitigate, alleviate or eliminate one or more of the above mentioned disadvantages singly or in any combination.

According to a first aspect of the invention there is provided a method for optimizing power settings of a communication system to mitigate interference. The method includes a step of monitoring a noise floor in the communication system. Another step determines if the noise floor crosses a threshold level, whereupon further steps are taken. One of these steps includes preventing any further increases in a Common Pilot Channel power level. Another of these steps includes randomly selecting and performing an interference mitigation measure. Another of these steps includes monitoring an interference status. Another of these steps includes allowing further increases in a Common Pilot Channel power level if the interference abates by more than a predetermined amount.

The invention may allow improved and/or facilitated operation in a cellular communication system with macro cells and underlay cells and may in particular allow reduced interference in such a communication system. In particular, the invention may provide a dynamic and improved technique to provide unilateral action on the part of residential access points to achieve optimal power levels for mitigating interference.

The underlay cells supported by the RAP of the invention may e.g. be micro-cells, pico-cells, and/or femto-cells. The cellular communication system may be a Code Division Multiple Access cellular communication system such as a Universal Mobile Telecommunication System (UMTS). The User Equipment may for example be a mobile station e.g. of a $3^{rd}$ generation cellular communication system.

According to another aspect of the invention there is provided a system for optimizing power settings in a communication system. The system includes an access point that monitors a noise floor in the communication system and determines if the noise floor crosses a threshold level, whereupon the access point prevents any further increases in a Common Pilot Channel power level, randomly selects and performs an interference mitigation measure, monitors an interference status, and allows further increases in a Common Pilot Channel power level if the interference abates by more than a predetermined amount. The system can also include a registration server that is in communication with the RAPs in order to allow an interferer to hand-in to the access point coverage.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a CDMA cellular communication system and in particular to a $3^{rd}$ Generation Cellular communication system such as a UMTS System. However, it will be appreciated that the invention is not limited to this application but may be applied to many other cellular communication systems. Also, the description will focus on scenarios of a serving access point of a femto-cell. However, it will be appreciated that the described principles apply equally to other hierarchical scenarios.

Figure 1:
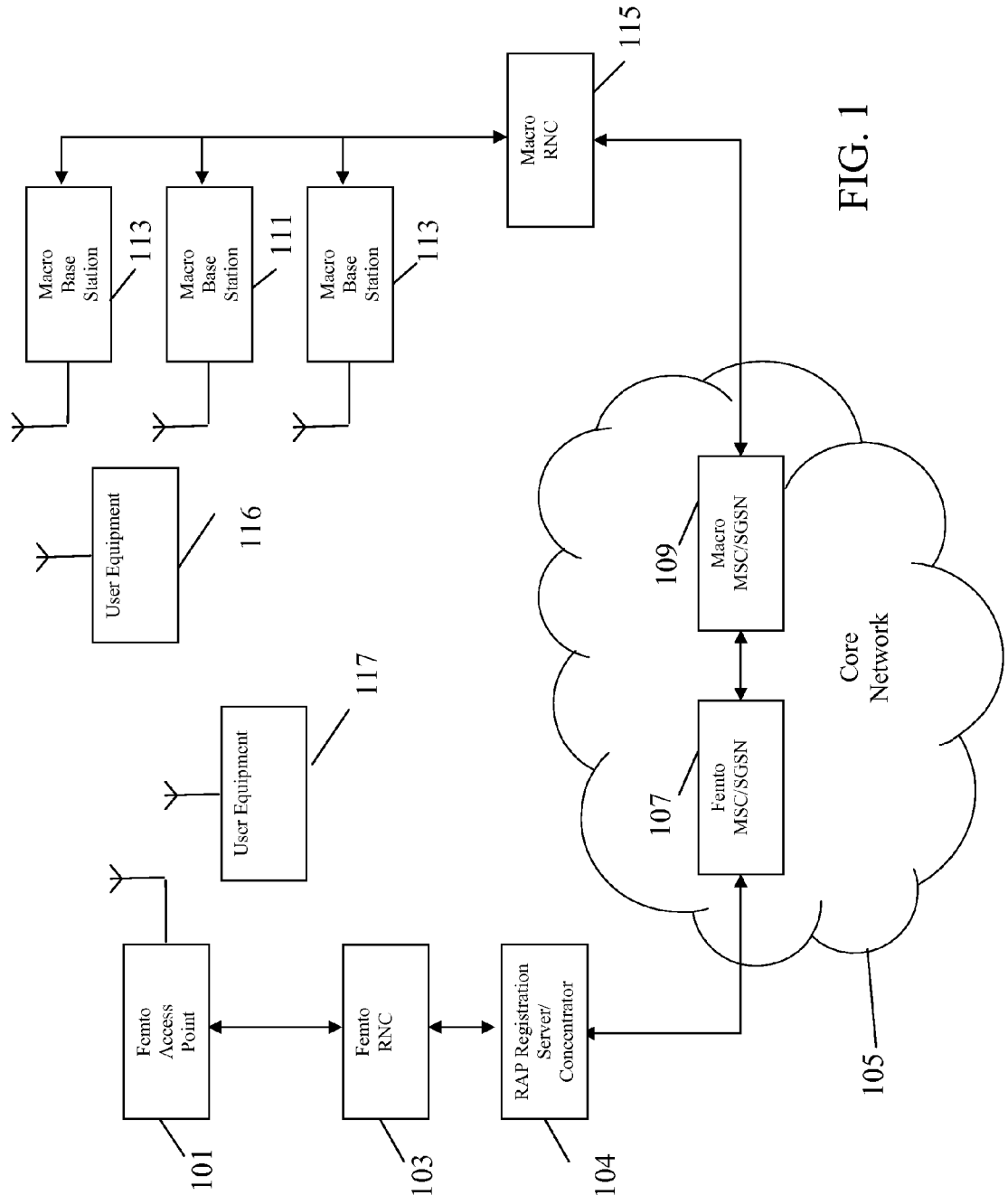
FIG. 1 illustrates an example of a cellular communication system, in accordance with some embodiments of the invention.

FIG. 1 illustrates an example of a cellular communication system which in the specific example is a UMTS cellular communication system. In the system, a macro-layer is formed by macro-cells supported by base stations. Furthermore, an underlay layer of pico-cells or femto-cells are supported by a large number of small base stations which henceforth will also be referred to as access points. Specifically, each access point may have an intended coverage of a single house or dwelling, and for a macro-cell coverage area of several hundred metres there may be hundreds of these underlay cells each supported by an individual access point.

In the system, each access point is controlled by a central server such as a RNC or MSC. However, it should be recognized that the access point can operate unilaterally and autonomously, in accordance with the present invention.

In the specific example of FIG. 1, one Residential Access Point (RAP) 101 is illustrated which supports a femto-cell within a dwelling and having a coverage area of typically ten to fifty meters. The RAP 101 is coupled to a femto RNC 103. RAP 101 and RNC 103 may be co-located in the same physical unit. In that case, the centralised network functions would be located in the MSC 107 or equivalent. The femto RNC 103 is furthermore coupled to a core network 105 which interfaces to other radio access networks and RNCs. A RAP registration server can be provided in any of RNC 103, MSC 107, Core network 105, or as a standalone element 104. In the example, the macro RNC 103 is coupled to a femto MSC 107 of the femto-layer which is further coupled to a macro MSC 109 of the overlayer macro-cells serving a different set of RNCs than the MSC 107. It should be recognized that the MSC (107, 109) functions need not be present if already incorporated into the associate RNC (103, 115).

The system furthermore comprises a number of macro-cell base stations 111, 113 (for clarity only three base stations are illustrated in FIG. 1). Each of the base stations 111, 113 supports a macro-cell, for example, with a coverage area of several hundred metres. The base stations 111, 113 implement the required functionality of a UMTS base station in order to support UMTS communications. One macro-cell base station 111 serving its own UE 116 overlays the femto-cell 101 serving the UE 117, while the other base stations 113 are neighbouring macro-cells.

It should be recognized that the femto RNC 103 and/or femto MSC 107 of the invention can be represented equally as an Access Point Concentrator or Controller (APC), RAP Registration Server (RRS), Virtual Private Network (VPN), Generic Access Network (GAN), Universal Mobile Access (UMA), or any other server, network gateway, or authority as are known in the art.

In practice, in the system of FIG. 1, during deployment of a cellular network, the proximity of neighbouring cells is known. Each cell is assigned a suitable common pilot power channel (CPICH in 3GPP) power level, such that the pilot powers are balanced at the cell edge between neighbours. In a centrally controlled deployment process, well established techniques exist to calculate the optimal pilot power levels.

The problem arises in residential deployments of cellular networks where the deployment process in incremental and ad hoc. In a residential deployment, the pilot power setting is defined by the requirements to (a) achieve an adequate coverage area within the residence, and (b) ensure the pilot power is balanced at the cell edge with respect to any neighbours. In the absence of any strong signalled neighbours, requirement (a) will define the boundaries In an area with a high density of neighbours, requirement (b) will dominate. However, in general, both conditions must be considered.

In operation, a user connects a residential access point to an access point server/concentrator. The server updates the RAP with the distance with respect to any neighbouring cells, the neighbours' power levels, and any necessary identifying information (e.g. frequency and scrambling codes). Using this information the RAP can assign an approximate pilot power level based on the maximum of: (a) the minimum power needed to achieve coverage in close proximity to the cell, and (b) the minimum power needed for a UE to receive a comparable power from both the RAP pilot and a neighbouring pilot, in close proximity to the cell. This power level will ensure that a call can be made on the RAP in the presence of interference, and that a UE is able to measure the power levels of all nearby neighbour's pilot signal levels.

During registration, the RAP is also required to calculate suitable power limits for any mobile or user equipment it serves. The downlink (DL) and uplink (UL) power limits ensure that the RAP does not cause any excessive interference on its neighbours. Power limits are based on the power that may be received by its neighbours. In order to calculate the received power the RAP must calculate the path loss with respect to each neighbour.

After connecting a UE for the first time, the attached UE is requested to measure the power levels of all neighbouring cells. Since the pilot power has been set approximately correctly during the registration phase, the UE is able to accurately measure the neighbours' pilot powers. If its own RAP CPICH were too high, all neighbours' CPICH powers would be unreadable, swamped by the local pilot.

Also, since appropriate power limits have been set for a RAP-attached UE, the UE can typically operate safely within the RAP coverage area, without causing interference to its neighbours. However, neighbouring UEs 116, 117 may interfere with each other if sharing a frequency between the RAP and macro.

The present invention provides suitable interference management techniques in the RAP itself. In this way, RAPs can be managed such that minimal interference issues are likely to be seen that will impact on normal RAP performance for the majority of all likely deployment scenarios. It is important to operate a separate PLMN code for good Cell Reselection management, and it is further recommended to operate a dedicated frequency for RAP where possible to provide maximum RF separation of the RAP and macro systems. When operating co-channel (macro/RAP), which is the problem to be solved in the present invention, interference mitigation measures are utilized at the RAP to ensure good operation, as will be detailed below.

One condition of co-channel interference is RAP-to-RAP interference. Mutual RAP interference can be extreme under certain specific conditions, and the present invention seeks to manage the RAP CPICH power level, sensitivity and operational frequency in order to mitigate these effects, without a conventional hierarchical UMTS Access Network deployment. Another condition of co-channel interference is Macro-to-RAP interference, where as soon as one macro UE connects to the macro site then the interference noise rise can be as much as 40 dB just due to the UE transmitting its DCH Pilot uplink, when the macro UE is towards the macro cell edge. This is challenging for the RAP as it means that it needs to match the noise rise of the macro seen at the RAP without causing interference to the macro itself, which is not always possible and is solved by the present invention.

In RAP deployments where the residences are either very close together or where macro interference is both high level and with frequent macro UE activity based noise rises then interference mitigation is necessary. The present invention provides interference mitigation techniques that includes: i) operate frequency scanning on setup of the RAP ii) manage RAP CPICH power level dynamically based on observed interference per current frequency, iii) operate noise rise triggered inter-frequency handover to another available frequency, iv) operate dynamic sensitivity control so that the RAP effectively deafens itself to the macro or RAP interferer interference and only listens to high level local signals in the residence, and v) operate a RAP Registration Server to manage levels of access to the RAP in extreme cases to enable management of the macro interferer when essential to do so.

It is possible for a large noise rise to be observed at RAP receivers when deployed near macro users or other RAP deployments. However, the present invention will minimise interference in a dense RAP deployment. Moreover, the present invention will maintain RAP operation in extreme cases of interference from macro users. As a fail safe, the RAP will ensure it does not cause an appreciable noise rise at the macro by limiting the maximum transmit power of its connected mobiles.

Due to the very low transmit power of a RAP (typical max ~11.8 dBm) and the very low power required by the RAP connected mobiles, isolation is typically sufficient for indoor deployment. However, interference conditions may arise when the coverage area of competing installations overlap. Because each system controls its own independent power control algorithms, a Near-Far effect may be observed for mobiles in close proximity in the same coverage area. In the case of a dense RAP deployment, for example in horizontally or vertically adjacent apartments, a scenario can occur where a mobile suffers the maximum attenuation due to fading and shadowing with respect to its own RAP. Simultaneously, this mobile could have a clear, unattenuated path to a neighbouring RAP.

In the case of a macro, the difference in respective distances means the interference effect can be far more pronounced. Consequently, additional techniques beyond what is proposed for the RAP-to-RAP interference are required. Despite various features enabling the RAP to manage interference, the level of interference that is possible from a macro-connected mobile is very large. A RAP must be able to avoid the interference if it occurs. The RAP will have to ability to switch frequencies in response to a rapid change in noise floor. The macro-connected user may also be capable of inter-frequency handoff is the presence of interference. However, the macro layer inter-frequency handover is based on the downlink signal quality. In contrast, the RAP conditions are based entirely on uplink quality.

The present invention avoids this problem by providing two users with a completely different metric, such that there is a very low probability that both users switch simultaneously and recreate the condition on another frequency. This probability could be adjusted to almost zero through adjustment of switching thresholds. When applied to RAP-to-RAP interference, simultaneous switch is more probable. Hence, in this case a RAP will be required to take the random choice to switch or to do nothing. In doing nothing, the RAP assumes the noise rise is passive, and will merely adjust its sensitivity as appropriate. Passive interference could occur for adjacent channel macro users, or when the interfering mobile is isolated from the power increase response of the original RAP user. The speed of such a switch can be greatly increased on a RAP. All calls on a RAP will be collectively switched to another frequency. Unlike in a macro where the target carrier is already populated with calls, a RAP does not need to negotiate for resources. Moreover, because of its flat architecture it has full local control to quickly switch its calls to another frequency. Finally, the RAP is provided with a fail safe mechanism where the power levels of a mobile are limited in a RAP coverage area. If would be impossible for a RAP to compete with a macro-connected user for power. In the unlikely event of a RAP having exhausted its ability to avoid interference, it will suffer a reduced level of quality in the presence of a macro-connected user. This mechanism is not expected to significantly reduce the call success rate a RAP; instead it is a fail safe mechanism to ensure the macro noise floor is not affected.

Figure 2:
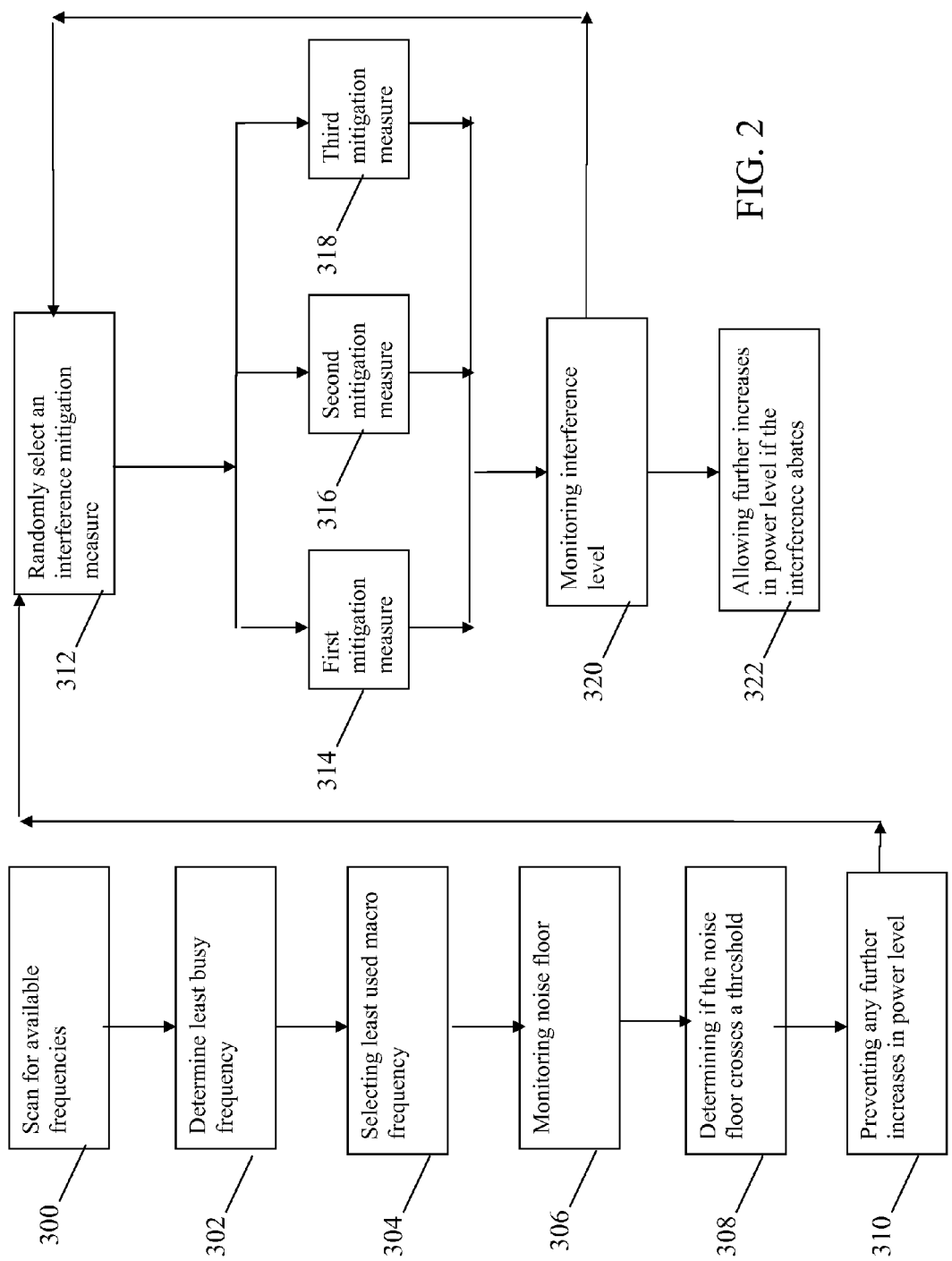
FIG. 2 illustrates a method, in accordance with some embodiments of the invention.

FIG. 2 illustrates an example of a method of operation for a cellular communication system in accordance with some embodiments of the invention. The cellular communication system includes a number of base stations supporting macro cells. The system also includes an access point supporting an underlay cell of one of the base stations.

The method describes optimizing power settings in a communication system to mitigate interference, and initiates in step 300 of where a Residential Access Point (RAP) powers up and runs a Common Pilot Channel (CPICH) frequency and power level discovery routine to determine the available frequencies defined by the particular operating system A next step 302 includes the RAP periodically scanning for activity on discovered macro frequencies during periods of no active calls to determine the least busy macro frequency.

A next step 304 includes the RAP selecting the least used macro frequency.

A next step 306 includes monitoring a noise floor in the communication system by the access point to detect the presence of interfering UEs from other systems on the same frequency (whether from another RAP UE of from a macro UE).

A next step 308 includes determining if the noise floor crosses a threshold level. In one example, this can be if the noise floor rises by more than a predetermined amount of decibels (e.g. 10 dB), which is interpreted as detection of a macro UE uplink interferer. In another example, this can be if rate of change of increase of noise floor is still increasing after N seconds, which is interpreted as detection of a macro UE uplink interferer. This step can be step-based or rate-of-change-of-noise-rise based or a combination in sequence. If an interference is detected the method proceeds with the following steps.

A next step 310 includes preventing any further increases in a Common Pilot Channel power level for that access point. This has a much larger effect than interfering adjacent RAP UEs as a Macro UE can ramp its power up to 250 mW typical whereas with RAP has only at 100 mW peak itself on uplink.

A next step 312 includes the RAP randomly selecting and performing predetermined interference mitigation measures (steps 314, 316, 318). Random selection is used so that two RAPs experience interference have a lower probability of select the same mitigation technique (and possibly the same alternative frequency) at the same time. It should be noted that no further increases in its own RAP Common power is allowed now as the RAP is aware that its connected mobiles are probably starting to interfere with the macro environment.

In step 314, a first interference mitigation measure includes forcing an inter-frequency blind handover for its active call reporting UEs to another of the macro frequencies in order to avoid interference from the macro environment and minimise its own interference to macro UEs. This is different than inter-carrier load balancing since it occurs unilaterally within the RAP mini access network and is uncoordinated at the RNC level across the two interfering Node-Bs. It should be noted that multiple inter-frequency options are allowed across all available frequencies defined for a particular operator.

In step 316, a second interference mitigation measure includes the RAP decreasing its sensitivity and thus being more deaf to the macro UE and only able to hear the local UE within the residence. This forces the UE to increase its power level, without increasing the RAP power level. Desensitising can be implemented for example by using antenna directionality. Further, selective de-sensitisation can be realised in several (approximately 5 db) steps using lossy low-cost FET/diode splitting.

In step 318, a third interference mitigation measure includes the RAP indicating to a registration server that it is experiencing interference resulting in an action to allow the interferer to hand-in to the RAP coverage. Specifically, the RAP will allow an external interferer to temporarily camp on itself in order that the interferer's RNC can manage its power back to manageable levels and complete its call and then be directed back to the macro after the call.

A next step 320 includes then the RAP starts interference monitoring algorithm by continuing to monitor the interference level until it subsides to normal levels again or upon abatement by more than a predetermined amount, whereupon in step 322 the power limit is removed allowing further increases in a Common Pilot Channel power level, and optionally the de-sensitisation is turned off. In practice, the trigger for a removal of the desensitization is that the interference level abates by more than a predetermined number of dB (typically expected to be ~5 dB).

With respect to the system inter-frequency handover, a next step 324 includes at the end of all current calls or call group on the new frequency an explicit macro frequency scan is conducted and as a result a new inter-frequency reconfiguration of the RAP can be made. In effect, when the RAP has no more active calls it reconsiders its noise levels and re-scans the macro frequencies and then may reset the mitigation techniques.

If the monitoring step 320 determines that the mitigation measures are ineffective, step 312 is performed again to randomly select and perform a different interference mitigation measure. Optionally, a timing hysteresis is used when switching between interference mitigation measures. In particular, hysteresis is applied to each Interference Mitigation switch occurrence of a few seconds before another switch is allowed or when the RAP has no remaining ongoing active calls.

Advantageously, in the present invention, RAP UEs that are suffering interference from a macro UE are temporarily moved to a different frequency than the macro UE to reduce the noise floor contribution and maintain the active call at the RAP without causing more interference to the macro. When there is little interference to the RAP then its sensitivity is kept low and the transmit power of the RAP and RAP UE are kept small with the net effect that RAP-to-RAP and RAP-to-macro interference is minimised. When there is a lot of interference to the RAP it desensitises itself thereby causing the RAP UE to increase its power towards the RAP whereas the macro UE at the extent of its macro range cannot, this may stimulate the macro UE to move and/or force macro behaviour of the frequency handover itself. Preferably, the present invention adds macro users to a RAP Registration Server, which moves the macro UE to the RAP (RNC)s control. As a result, the present invention reduces mutual UE uplink interference RAP-to-RAP and RAP-to-MACRO.

It will also be appreciated that although the above description focuses on a UMTS embodiment, it is equally applicable to other systems and can be applicable to hybrid communication systems using different radio access technologies. For example, the macro base station may be a UMTS base station whereas the access point may be a GSM base station capable of supporting GSM air interface communications but not UMTS air interface communications. Thus, the same method of the invention can be used. However, in the example, the user equipment is a dual mode remote station providing inter-system communication between UMTS to GSM.

Also, although the above description has focused on a RAP, it will be appreciated that the described principles are equally applicable to a situation where these are integrated into a different physical or logical network element.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A method for optimizing power settings in a communication system, the method comprising the steps of:
   monitoring a noise floor in the communication system;
   determining if the noise floor crosses a threshold level, whereupon:
      preventing any further increases in a Common Pilot Channel power level;
      randomly selecting and performing an interference mitigation measure, wherein the interference mitigation measure is selected from the group consisting of: forcing an inter-frequency blind handover for an active call, decreasing a sensitivity, and allowing an interferer to hand-in to an access point coverage;
   monitoring an interference level; and
   allowing further increases in the Common Pilot Channel power level if the interference abates by more than a predetermined amount.

2. The method of claim 1, wherein the selecting and performing step further includes conducting a new macro frequency scan at the end of all current calls.

3. The method of claim 2 wherein the selecting and performing step further includes performing a new inter-frequency reconfiguration of an access point.

4. The method of claim 1 wherein if the monitoring an interference step shows no improvement in interference levels, the selecting and performing step is performed again to randomly select and perform a different interference mitigation measure.

5. The method of claim 4 wherein a timing hysteresis is used when switching between interference mitigation measures.

6. An apparatus for optimizing power settings in a communication system, the system comprising:
   an access point that monitors a noise floor in the communication system and determines if the noise floor crosses a threshold level, whereupon the access point prevents any further increases in a Common Pilot Channel power level, randomly selects and performs an interference mitigation measure, monitors an interference level, and allows further increases in the Common Pilot Channel power level if the interference abates by more than a predetermined amount;
   wherein the interference mitigation measure is selected from the group consisting of: forcing an inter-frequency blind handover for an active call, decreasing a sensitivity of the access point, and indicating to a registration server that it is experiencing interference and the registration server allowing an interferer to hand-in to an access point coverage.

* * * * *